Figure 1:
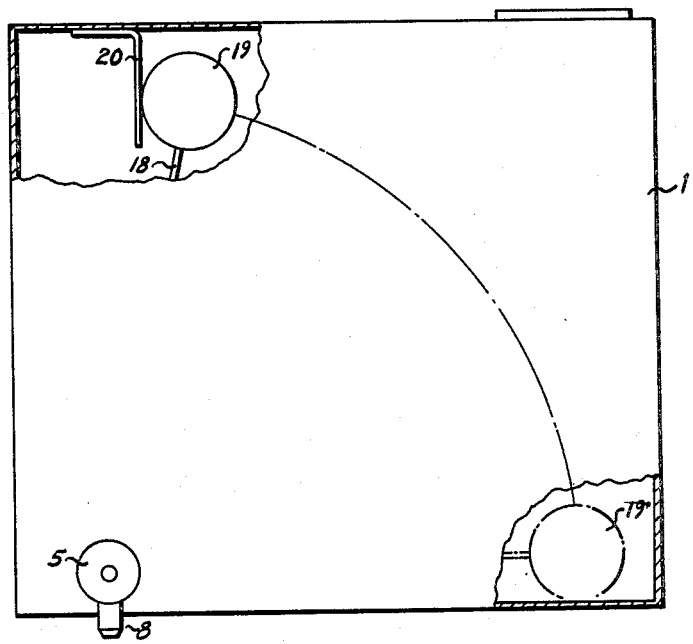

Aug. 25, 1964   J. M. DUNSTON   3,145,726

LIQUID FLOW CONTROL VALVE

Filed July 30, 1962

INVENTOR.
JAMES M. DUNSTON

BY
Herbert Berl though the valve is manually adjustable in a conventional manner to open the valve and establish the flow of liquid through the valve at an optimum rate and by providing a valve seat which is movable with respect to the valve stem in response to changes in the level of liquid in a reservoir whereby the valve seat element moves away from the valve stem to increase the opening of the valve as the head of liquid in the reservoir decreases such that a substantially constant flow rate is maintained.

United States Patent Office 3,145,726
Patented Aug. 25, 1964

3,145,726
LIQUID FLOW CONTROL VALVE
James M. Dunston, Natick, Mass., assignor to the United States of America as represented by the Secretary of the Army
Filed July 30, 1962, Ser. No. 213,555
7 Claims. (Cl. 137—398)
(Granted under Title 35, U.S. Code (1952), sec. 266)

The invention described herein, if patented, may be manufactured and used by or for the Government for governmental purposes without the payment to me of any royalty thereon.

This invention relates to a liquid flow control valve which is both manually and automatically adjustable.

In equipment utilizing liquids fed by gravity from a storage tank or reservoir through a control valve to another portion of the equipment where it is to be utilized, as for example, in gasoline-fired immersion type water heaters such as are described in Military Specification MIL-H-1597A dated June 10, 1959, the rate of flow of the liquid is usually controlled manually by means of a needle valve in the liquid feed line. Since the rate of flow is directly dependent upon the pressure on the liquid or the head of liquid in a gravity feed device, the progressive decrease in the amount of liquid in the reservoir, and thus a decrease in the head, requires frequent readjustment of the control valve setting if an optimum flow rate is to be maintained. This requirement obviously places a burden on the operators of such devices in that close attention to the operation must be maintained if optimum performance is to be realized. In military operations, for example, it is especially important to obtain the most efficient and rapid performance from such equipment while the operator may be required to perform numerous other duties concurrently. In the field feeding concepts of the U.S. Army, the heating of large quantities of water for cooking and sanitation purposes and, more recently, for the reconstitution of dehydrated foods, is accomplished by immersion water heaters of the type referred to above. Any decrease in the rate of flow of the liquid fuel to the burner of such a heater after it has been initially set at an optimum rate results in unnecessary and undesirable delays as well as inefficient fuel consumption. Such a heater, when closely attended to maintain proper fuel flow rates, will heat approximately twenty gallons of water to the desired temperature in about thirty minutes. Under the same conditions, after two hours of unattended operation, the water will still not have attained the desired temperature as a result of diminished fuel flow to the burner.

It is, therefore, an object of this invention to provide a liquid flow control valve for automatically maintaining a substantially constant flow rate of liquid by gravity from a reservoir regardless of changes in the amount of liquid in the reservoir.

A further object of this invention is to provide a needle valve for controlling the flow of liquid by gravity from a reservoir which is manually adjustable for establishing an initial flow rate and which thereafter automatically maintains substantially the same flow rate despite a progressive decrease in the amount of liquid in the reservoir.

Various other objects and advantages will appear from the following description of one embodiment of the invention and in the appended claims.

The foregoing objects are accomplished by providing a needle valve in which the valve stem is manually adjustable in a conventional manner to open the valve and establish the flow of liquid through the valve at an optimum rate and by providing a valve seat which is movable with respect to the valve stem in response to changes in the level of liquid in a reservoir whereby the valve seat element moves away from the valve stem to increase the opening of the valve as the head of liquid in the reservoir decreases such that a substantially constant flow rate is maintained.

Figure 2:
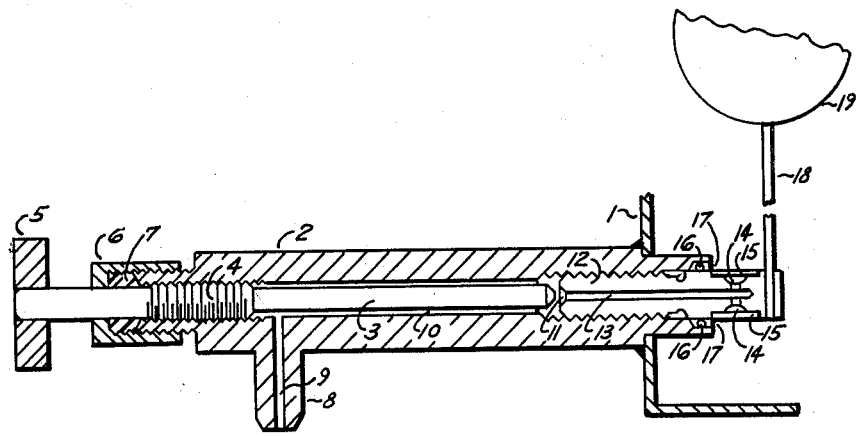

The present invention may be more fully understood by reference to the accompanying drawings in which like numerals are used to designate like parts in the various views and in which:

FIGURE 1 is a side elevation, partly broken away, showing a liquid fuel tank and a flow control valve in accordance with the present invention; and FIGURE 2 is a partial longitudinal sectional view of the control valve.

Referring more particularly to the drawings, where for purposes of illustration one embodiment of the invention is shown, the numeral 1 designates a liquid fuel tank of generally rectangular shape. The body of needle valve 2 is mounted in the wall of tank 1 at a point near the lowest portion of the tank and in communication with the interior of the tank. The valve 2 is provided with a valve stem 3 having threaded portion 4 which engages a corresponding internally threaded portion in the valve body. The inner end of valve stem 3 is pointed or otherwise shaped in relation to the valve seat to permit fine adjustment of the valve opening. The outer end of valve stem 3 is provided with a knob 5 to facilitate manual operation of the valve stem. Packing nut 6 and packing 7 are provided to seal the outer end of the valve body. Spout 8 having a center passage 9 in communication with the center passage 10 of the valve body provides communication between the interior of the valve body and the burner or other point (not shown) to which the fuel is being fed. The valve construction as thus far described will be recognized as typical of conventional needle valves.

The valve seat 11 which is preferably conoidal in shape as is customary in needle valves is formed on one end of an elongated cylindrical valve seat element 12. The valve seat element 12 extends from within the body of valve 2 beyond the inner end thereof into the interior of the fuel tank 1. The valve seat element 12 is provided with an externally threaded portion which engages mating internal threads in the passage 10 of the valve body such that the valve seat element 12 advances into the valve body or recedes therefrom depending upon the direction in which it is rotated. The valve seat element 12 is provided with a center passage 13 extending from the center of the valve seat 11 to inlet ports 14 which are in communication with the interior of the fuel tank 1. A filter screen 15 is preferably provided over the inlet ports 14 to prevent dirt or other impurities from entering and clogging the valve.

A O-ring 16 of a resilient material which will resist degradation by the fuel or other liquid in the tank 1 is snugly fitted on the circumference of the valve seat element and positioned in an annular recess 17 which is provided in the inner end of the body of valve 2 for the purpose of preventing leakage of fuel through the threads between the valve seat element and the valve body. The O-ring 16 may be held in place by friction or by providing a circumferential groove (not shown) therefor in the valve seat element 12. One end of an elongated float rod 18 is attached to the portion of the valve seat element 12 extending into the fuel tank 1 in a position where it will be free to rotate through an arc of about 90° generally vertical to horizontal positions within the fuel tank. A float 19 comprised of a hollow sphere or other buoyant means is fixed to the free end of the float rod 18 such that if the level of the liquid in the fuel tank rises or falls the float 19 in conjunction with the float rod 18 will cause the valve seat element 12 to rotate within the body of valve 2. A stop 20 is mounted on an inner wall of the fuel tank as best shown in FIGURE 1 so as to prevent the float 19 and float rod 18 from being rotated beyond a point at which it will always be supported only by the liquid in the tank, that is to prevent the float from reaching a dead center position at or beyond 90° from the horizontal. The position of the float 19, when the fuel tank is substantially empty is represented by 19'.

In the embodiment illustrated a right hand thread is used on valve seat element 12 and the corresponding thread in passage 10. Thus, when float 19 rises as a result of liquid fuel being added to the tank, the valve seat element 12 is rotated counterclockwise and thereby advances into the body of the valve 2, reaching its point of maximum advance when the float 19 makes contact with stop 20. As the amount of fuel in the tank diminishes, the float drops causing the valve seat element to turn in a clockwise direction as viewed in FIGURE 1, whereby the valve seat element recedes from its original position with respect to the point of the valve stem thus increasing the degree of opening of the valve.

In the operation of the valve and controlling the flow of fuel to a burner, the valve is closed by turning knob 5 in a clockwise direction as viewed in FIGURE 1 until the valve stem seats on the valve seat 11. When the tank has been filled with fuel and the spout 8 connected to a burner (not shown) the valve is opened by rotating knob 5 in a counterclockwise direction until an optimum flow of fuel as determined by the operator has been established. It should be noted that since the valve is opened the float 19 will be free to assume a position on the surface of the fuel in the tank 1. As the fuel is consumed and the level of fuel in the tank drops the float 19 will drop correspondingly. This movement of the float 19 in conjunction with float rod 18 causes valve seat element 12 to turn whereby the opening between the end of the valve stem 3 and the valve seat 11 is gradually increased in direct relationship to the drop in the level of fuel in the tank. The increased opening of the valve compensates for the decrease in the head of fuel in the tank and the fuel flow rate remains substantially constant as the entire tankfull of fuel is consumed.

While, generally speaking, the filling of the fuel tank will be done immediately prior to use, there may be instances where the tank is filled with no immediate prospect of use. Under these circumstances with the valve stem 3 in contact with valve seat 11, the valve seat element 12 will not be free of contact and the float 19 will therefore be restrained from assuming its normal position on the surface of the fuel in the tank. Under these circumstances it is preferable to release the float by slowly opening the valve sufficiently to permit the valve seat element 12 to rotate under the influence of the float until the latter assumes its normal position at the surface of the liquid in the tank. The valve stem 3 is then reseated against the valve seat element 12.

It is to be understood that the rotation of the valve seat element is limited to approximately one-quarter turn such that the amount of adjustment obtained will be a function of the design characteristics of the valve for a particular application. The present invention relates primarily to valves providing a relatively fine degree of adjustment within a predetermined operating range, for example, 15 to 25 cc. per minute in the case of the immersion water heater mentioned above. The size and configuration of the valve stem point, valve seat and related fluid passages, as well as the pitch of the thread on the valve seat element may be selected to provide a valve with the desired operating range for a particular application. Within this predetermined operating range, the present invention provides for automatic adjustment of the valve to maintain a substantially constant rate of flow by gravity despite changes in the amount of liquid in the supply reservoir and resulting changes in the pressure or head under which fuel flows through the valve. This performance is obtained by the present invention in a single valve which combines a manually operable control means for turning the valve on or off and for establishing the desired rate of flow through the valve and an automatic adjustment to maintain the flow rate so established despite changes in the head of liquid flowing through the valve.

While the present invention is particularly useful in conjunction with heaters of many types as a fuel flow control device, it can also be used as a flow control device for water for steam generators, for humidifying units, for oils, for feeding liquid chemicals in various types of commercial operations, and any other use of liquids where a manual presetting of rate of flow of the liquid by gravity is desirable and thereafter an automatic maintenance of this preset rate of flow is desired during the depletion of the supply of the liquid in a reservoir or tank. Regardless of what the original manual setting of the needle valve is, within this range, this rate of flow will be maintained substantially constant by the automatic adjusting portion of the device.

It will be understood that various changes in the details, materials, steps and arrangements of parts, which have been herein described and illustrated in order to explain the nature of the invention, may be made by those skilled in the art within the principle and scope of the invention as expressed in the appended claims.

I claim:

1. A valve for controlling the flow of liquid from a tank to a utilization device comprising a valve body, a valve stem mounted within said body for movement toward and from a valve seat to establish flow through the valve at a selected rate, a valve seat element embodying a valve seat mounted within said body for movement toward and from said valve stem and means responsive to the level of liquid in said tank connected to said valve seat element whereby said valve seat element moves away from said valve stem as the level of liquid in said tank is lowered.

2. A valve for controlling the flow of liquid from a tank to a utilization device comprising a valve body, a valve stem mounted within said body for movement toward and from a valve seat to open and close said valve and to establish flow therethrough at a selected rate, a valve seat element embodying a valve seat threadedly mounted within said body for movement toward and from said valve stem and float means mounted within said tank responsive to changes in the level of liquid therein and connected to said valve seat element to cause rotational movement thereof in response to movement of said float means whereby said valve seat element moves away from said valve stem as the level of liquid in said tank is lowered.

3. A valve for controlling the flow of liquid from a tank to a utilization device comprising a valve body, a valve stem mounted within said body for movement toward and from a valve seat to open and close said valve and to establish flow therethrough at a selected rate, a valve seat element embodying a valve seat threadedly mounted within said body for movement toward and from said valve stem, a float arm fixed to said valve seat element extending radially therefrom within said tank, a float fixed to the free end of said float arm, said float arm and float being capable of rotational movement within said tank about a common axis of rotation with said valve seat element in response to changes in the level of liquid within the tank whereby said valve seat element moves away from said valve stem as the level of liquid in said tank is lowered.

4. A needle valve for controlling the flow of liquid from a tank to a utilization device comprising a valve body mounted on said tank in communication with the interior thereof, a valve stem mounted within said valve body for movement toward and from a valve seat to establish flow through said valve at a selected rate, a valve seat element embodying a conoidal valve seat threadedly mounted within said valve body for movement toward and from said valve stem, said valve seat element extending into the interior of said tank, and float means responsive to the level of liquid in said tank connected to said valve seat element for rotational movement thereof in response to movement of said float means whereby said valve seat element moves toward or from said valve stem in response to changes in the level of liquid in said tank.

5. In a needle valve for controlling the flow of liquid from a tank to a utilization device having a valve body, a valve stem and a valve seat, said valve stem being movable with respect to said valve seat for opening said valve to establish flow therethrough at a selected rate, the improvement comprising embodying said valve seat in an element movable with respect to the valve body and means responsive to changes in the height of the liquid in the tank for moving said element in response to said changes in the height of the liquid in the tank whereby the opening of said valve is increased as the height of liquid in the tank is decreased.

6. In a needle valve for controlling the flow of liquid from a tank to a utilization device having a valve body, a valve stem and a valve seat, said valve stem being movable with respect to said valve seat for opening said valve to establish a selected rate of flow therethrough, the improvement comprising embodying said valve seat in an element threadedly mounted within said valve body and float means responsive to changes in the height of the liquid in the tank for rotating said threadedly mounted element in response to said changes in the height of the liquid in the tank whereby the opening of said valve is increased as the height of liquid in the tank is decreased.

7. In a needle valve for controlling the flow of liquid from a tank to a utilization device having a valve body, a valve stem and a valve seat, said valve stem being movable with respect to said valve seat for opening said valve to establish a selected rate of flow therethrough, the improvement comprising embodying said valve seat in an element threadedly mounted within said valve body and movable with respect to the valve body and float means responsive to changes in the height of the liquid in the tank for moving said threadedly mounted element axially with respect to the valve body a distance up to that corresponding to approximately one-quarter turn of said threadedly mounted movable element in response to changes in the height of the liquid in the tank whereby the opening of said valve is increased as the height of the liquid in the tank is decreased.

References Cited in the file of this patent
UNITED STATES PATENTS 1,239,267    Groves _____ Sept. 4, 1917
1,246,079    Fox _____ Nov. 13, 1917